US012667146B2

(12) United States Patent
Chee et al.

(10) Patent No.: US 12,667,146 B2
(45) Date of Patent: Jun. 30, 2026

(54) NITRILE GLOVE

(71) Applicant: Hartalega Sdn Bhd, Bandar Sri Damansara (MY)

(72) Inventors: Wei Kit Chee, Bandar Sri Damansara (MY); Kam Hon @ Kwan Kam Onn Kuan, Bandar Sri Damansara (MY); Mun Leong Kuan, Bandar Sri Damansara (MY); Eu Jin Kuan, Bandar Sri Damansara (MY); Fook Chuan Lai, Bandar Sri Damansara (MY); Mei Ling Cheah, Bandar Sri Damansara (MY); Sze Hui Lim, Bandar Sri Damansara (MY)

(73) Assignee: Hartalega Sdn Bhd, Bandar Sri Damansara (MY)

( * ) Notice: Subject to any disclaimer, the term of this patent is extended or adjusted under 35 U.S.C. 154(b) by 348 days.

(21) Appl. No.: 18/015,225

(22) PCT Filed: Aug. 2, 2021

(86) PCT No.: PCT/MY2021/050065
§ 371 (c)(1),
(2) Date: Jan. 9, 2023

(87) PCT Pub. No.: WO2022/031163
PCT Pub. Date: Feb. 10, 2022

(65) Prior Publication Data
US 2023/0255286 A1 Aug. 17, 2023

(30) Foreign Application Priority Data
Aug. 3, 2020 (MY) .............................. PI2020003993

(51) Int. Cl.
C08K 3/22 (2006.01)
A41D 19/00 (2006.01)

(52) U.S. Cl.
CPC ............ A41D 19/0055 (2013.01); C08K 3/22 (2013.01); C08K 2003/2262 (2013.01)

(58) Field of Classification Search
CPC .................... A41D 19/0055; C08K 2003/2262
(Continued)

(56) References Cited

U.S. PATENT DOCUMENTS 2,567,988 A 9/1951 Bethe et al.
5,357,636 A 10/1994 Dresdner et al.
(Continued)

FOREIGN PATENT DOCUMENTS

CN 111358094 A 7/2020
CN 111358095 A 7/2020
(Continued)

OTHER PUBLICATIONS

International Preliminary Report on Patentability for PCT Application No. PCT/MY2021/050065 Mailed on Feb. 16, 2023, 7 pages.
(Continued)

*Primary Examiner* — Tajash D Patel
(74) *Attorney, Agent, or Firm* — Fletcher Yoder, P.C.

(57) ABSTRACT

Provided are nitrile gloves comprising manganese dioxide, that may have improved permeation resistance, especially improved permeation resistance against hydrogen peroxide. Provided also are methods for preparing the nitrile gloves and improving the permeation resistance of nitrile gloves.

17 Claims, 3 Drawing Sheets

(58) Field of Classification Search
   USPC .......................................................... 2/161.7
   See application file for complete search history.

(56)                    References Cited

U.S. PATENT DOCUMENTS

| | | | |
|---|---|---|---|
| 6,706,816 B2 | 3/2004 | Williams et al. | |
| 8,816,029 B2 * | 8/2014 | Wang ................... | C09D 139/00 |
| | | | 526/263 |
| 9,475,263 B1 | 10/2016 | Rangan et al. | |
| 9,587,091 B2 | 3/2017 | Enomoto et al. | |
| 2007/0254015 A1 | 11/2007 | Ishikawa et al. | |
| 2009/0130161 A1 * | 5/2009 | Sarangapani .......... | A01N 59/16 |
| | | | 424/618 |
| 2019/0254765 A1 * | 8/2019 | Beck .................. | A41D 19/0031 |

FOREIGN PATENT DOCUMENTS

| | | | |
|---|---|---|---|
| KR | 100665719 B1 | 1/2007 | |
| WO | 2015006806 A1 | 1/2015 | |
| WO | 2018119490 A1 | 7/2018 | |
| WO | WO-2022031163 A1 * | 2/2022 | ......... A41D 19/0055 |

OTHER PUBLICATIONS

Search Report and 1st Office Action for CN Application No. 202180058022.1, dated Jul. 29, 2025, 22 Pages.

\* cited by examiner

*Horizontal dotted line = Breakthrough time (BTT) as per defined in EN ISO 374-1 = 1µg/cm²/min*

*Horizontal dotted line = Breakthrough time (BTT) as per defined in EN ISO 374-1 = 1µg/cm²/min*

NITRILE GLOVE

FOREIGN PRIORITY INFORMATION

This application claims priority to PCT application number PCT/MY2021/050065, filed Aug. 2, 2021, which claims priority to European patent application number PI2020003993, filed Aug. 3, 2020.

FIELD OF INVENTION

The present invention relates to a nitrile glove with improved permeation resistance, and to methods and uses for increasing the permeation resistance of a nitrile glove.

BACKGROUND

The listing or discussion of a prior-published document in this specification should not necessarily be taken as an acknowledgement that the document is part of the state of the art or is common general knowledge. The resistance to permeation for rubber gloves is often assessed in accordance to EN16523-1: 2015+A1:2018, for which there are 6 different performance levels as listed in Table 1. The breakthrough time (BTT) is the time since the start of the test at which the tested chemical is detected through the material at a defined rate of 1 $\mu g/cm^2/min$.

TABLE 1

| Permeation Performance Level | |
| --- | --- |
| Measured Breakthrough Time, min | Permeation Performance Level |
| >10 | 1 |
| >30 | 2 |
| >60 | 3 |
| >120 | 4 |
| >240 | 5 |
| >480 | 6 |

There are 18 test chemicals specified in EN ISO 374-1: 2016+A1:2018 and 3 level of gloves performance; Type A, B and C. Gloves will be classified as "Type C" if at least performance level 1 is achieved against at least 1 of 18 chemicals. Type B classification is for gloves which achieve a minimum of level 2 against at least 3 out of 18 chemicals. Lastly, Type A classification is given to those gloves that achieved performance Level 2 again at least 6 out of the 18 chemicals (SATRA2019, EN16523-1 chemical permeation testing of gloves. Retrieved Apr. 14, 2020, from https://www.satra.com/spotlight/article.php?id=492).

Currently, the chemical permeation resistance level of nitrile examination gloves for glove weights at 3.2 and 3.0 grams (M size) are at Type B (>30 minutes breakthrough time for 3 different chemicals). The breakthrough time of the third category performance level 2 chemical, hydrogen peroxide, is on the borderline limit for level 2 for the mentioned glove weight. As glove development tends towards lighter weight and subsequently thinner film profile, there is an increased likelihood that this permeation barrier test will be failed. As such, there is a need to improve the chemical barrier performance of the gloves membrane without increasing the thickness of the glove, so as to provide thin gloves having high permeation barrier performance.

SUMMARY OF INVENTION

The present inventors have surprisingly found that the incorporation of manganese dioxide in a nitrile rubber glove drastically increases the permeation resistance of the glove to hydrogen peroxide. Manganese dioxide is able to catalyse the breakdown of hydrogen peroxide into water and oxygen, before the hydrogen peroxide has passed through the nitrile rubber.

Accordingly, the present invention provides the following numbered clauses.

1. A nitrile glove comprising manganese dioxide.
2. The nitrile glove according to Clause 1, wherein the manganese dioxide is impregnated within the nitrile rubber of the nitrile glove.
3. The nitrile glove according to Clause 1 or 2, wherein the manganese dioxide is present in the form of micro-particles.
4. The nitrile glove according to Clause 3, wherein the micro-particles of manganese dioxide have a mean particle size of from about 0.1 $\mu m$ to about 20 $\mu m$, optionally about 0.5 $\mu m$ to about 10 $\mu m$, further optionally about 2 $\mu m$ to about 6 $\mu m$.
5. The nitrile glove according to any one of the preceding clauses wherein the manganese dioxide is present in an amount of from about 0.05 parts per hundred rubber (phr) to about 0.9 parts per hundred rubber.
6. The nitrile glove according to Clause 5, where the manganese dioxide is present in an amount of about 0.1 phr to about 0.85 phr.
7. The nitrile glove according to Clause 6, where the manganese dioxide is present in an amount of about 0.3 phr to about 0.7 phr.
8. The nitrile glove according to any one of the preceding clauses, wherein the manganese dioxide is provided in a form that is able to catalyse the reduction of hydrogen peroxide to water and oxygen.
9. The nitrile glove according to any one of the preceding clauses, wherein the manganese dioxide does not form part of a crosslink in the glove.
10. A method of preparing a nitrile glove according to any one of the preceding clauses, the method comprising the following steps:
    (i) providing a dispersion of manganese dioxide;
    (ii) adding the manganese dioxide dispersion to compounded nitrile latex; and
    (iii) forming a glove from the compounded nitrile latex.
11. The method according to Clause 10, further comprising adding a surfactant to the dispersion of manganese dioxide in step (i), optionally wherein the surfactant is a salt of naphthalenesulfonic acid, more optionally wherein the surfactant is naphthalenesulfonic acid, sodium salt.
12. The method according to Clause 11, wherein the surfactant is present in the dispersion in an amount of from 0.1 to 3 wt. %, optionally from 0.15 to 2.5 wt. %, more optionally from 0.2 to 2 wt. %.
13. The method according to Clause 11 or 12, further comprising adding a thickener to the dispersion of manganese dioxide in step (i), optionally wherein the thickener is bentonite and/or wherein the thickener is present in the dispersion in an amount of from 1 to 10 wt. %, such as 3 to 8 wt. %, such as about 5 wt. %.
14. The method according to any one of Clauses 11 to 13, further comprising adding a wetting agent to the dispersion of manganese dioxide in step (i), optionally wherein the wetting agent is an acetylenic diol-based non-ionic surfactant (e.g. Surfadol TG) and/or wherein the wetting agent is present in the dispersion in an amount of from 0.005 to 0.05 wt. %, such as 0.01 to 0.03 wt. %, such as about 0.02 wt. %.

15. Use of manganese dioxide in a nitrile glove to increase the chemical permeation barrier performance of the nitrile rubber against hydrogen peroxide.

16. A method of increasing the chemical permeation barrier performance of the nitrile rubber of a nitrile glove against hydrogen peroxide, said method comprising a step of incorporating manganese dioxide into the nitrile glove or a precursor to the nitrile glove.

17. The use according to Clause 15, or the method according to claim 16, wherein the manganese dioxide is impregnated within the nitrile rubber of the nitrile glove.

18. The use or method according to any one of Clauses 15 to 17, or the method according to claim 10, wherein the manganese dioxide is micro-particles of manganese dioxide.

19 The use or method according to Clause 18, wherein the micro-particles of manganese dioxide have a mean particle size of from about 0.1 μm to about 20 μm, optionally about 0.5 μm to about 10 μm, further optionally about 2 μm to about 6 μm.

20. The use or method according to Clause 18 or 19, wherein the micro-particles of manganese dioxide are present in the nitrile glove in an amount of from 0.05 parts per hundred rubber (phr) to 0.9 parts per hundred rubber.

21. The use or method according to Clause 20, wherein the micro-particles of manganese dioxide are present in the nitrile glove in an amount of from 0.1 phr to 0.8 phr.

22. The use or method according to Clause 21, wherein the micro-particles of manganese dioxide are present in the nitrile glove in an amount of from 0.3 phr to 0.7 phr.

DRAWINGS

Certain embodiments of the present disclosure are described more fully hereinafter with reference to the accompanying drawings.

DESCRIPTION

Figure 1:
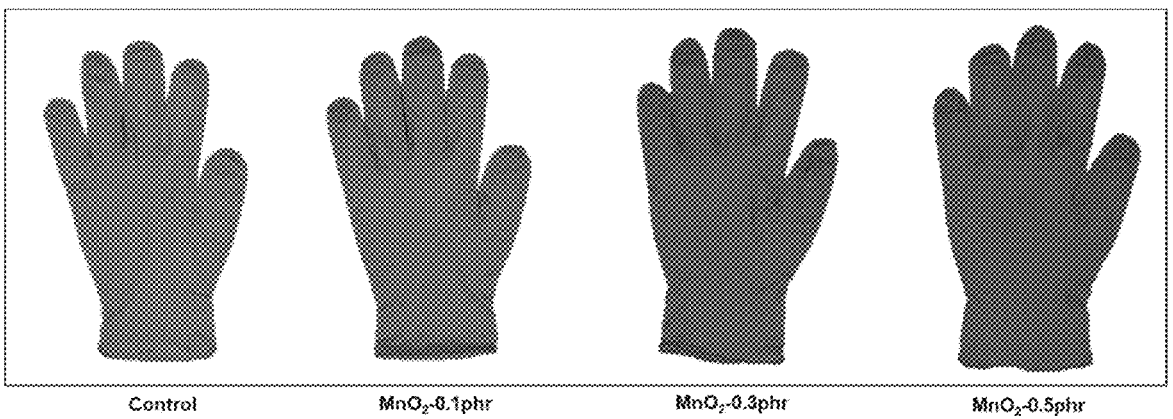
FIG. 1 shows how the darkness of a nitrile glove varies depending on the amount of manganese dioxide dispersed within the rubber.

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

In a first embodiment, the present invention provides a nitrile glove comprising manganese dioxide. As used herein, "nitrile glove" refers to a glove that is made from nitrile rubber, i.e. acrylonitrile butadiene rubber. The nitrile glove is formed from nitrile rubber, which comprises manganese dioxide. The manganese dioxide is typically impregnated within the nitrile rubber, for example as microparticles of manganese dioxide. As such, the manganese dioxide is not solely present within another material that may form part of the nitrile glove, such as a fabric layer (but may nonetheless be present in such another layer, provided it is present within the nitrile rubber).

"Impregnated within" is used herein to describe manganese dioxide particles that are held within (e.g. bound to) the nitrile rubber matrix in the glove. This means that the manganese dioxide does not leach out of the glove. Typically, the manganese dioxide particles are substantially evenly dispersed throughout the rubber matrix.

The manganese dioxide is typically in a form that is able to catalyse the reduction of hydrogen peroxide to water and oxygen, and as such typically does not form part of any crosslink within the nitrile rubber. This ensures that the manganese dioxide is able to form the required coordination complexes for it to catalyse the reduction of hydrogen peroxide.

The manganese dioxide may be present as microparticles. When the manganese dioxide is present as microparticles, the microparticles may have a mean particle size of from about 0.1 μm to about 20 μm, for example about 0.5 μm to about 10 μm, such as about 2 μm to about 6 μm. The microparticles may be present in an amount of from about 0.05 parts per hundred rubber (phr) to about 0.9 parts per hundred rubber. For example, the manganese dioxide may be present in an amount of from about 0.1 phr to about 0.85 phr, such as about 0.3 phr to about 0.7 phr.

In a second embodiment, the invention provides a method of making a nitrile glove comprising manganese dioxide. The method may comprise the following steps:

(i) providing a dispersion of manganese dioxide;

(ii) adding the manganese dioxide dispersion to compounded nitrile latex; and (iii) forming a glove from the compounded nitrile latex.

In some aspects of the second embodiment of the invention, the method may further comprise adding a surfactant to the dispersion of manganese dioxide in step (i). The surfactant may be a salt of naphthalenesulfonic acid, such as naphthalenesulfonic acid, sodium salt. The use of a surfactant such as naphthalenesulfonic acid, sodium salt may help the formation of a dispersion of $MnO_2$, without resulting in sedimentation or caking of the $MnO_2$. In other words, the surfactant helps to increase the dispersion stability of the $MnO_2$, which improves the processability of the suspension.

When a surfactant is used, it may be present in the dispersion in an amount of from 0.1 to 3 wt. %, for example from 0.15 to 2.5 wt. %, such as from 0.2 to 2 wt. %.

In addition to a surfactant, a thickener may also be added to the dispersion of manganese dioxide in step (i), optionally wherein the thickener is bentonite and/or wherein the thickener is present in the dispersion in an amount of from 1 to 10 wt. %, such as 3 to 8 wt. %, such as about 5 wt. %. The use of a thickener may further assist the formation of a dispersion of $MnO_2$, without resulting in sedimentation or caking of the $MnO_2$ even after prolonged periods of time.

In other words, the thickener also helps to increase the dispersion stability of the $MnO_2$, which improves the processability of the suspension.

A wetting agent may also be added to the dispersion of manganese dioxide in step (i), in order to improve the processability of the dispersion. Suitable wetting agents include an acetylenic diol-based non-ionic surfactant (e.g. Surfadol TG). When a wetting agent is added, it may be added in any suitable amount. For example, the wetting agent may be present in the dispersion in an amount of from 0.005 to 0.05 wt. %, such as 0.01 to 0.03 wt. %, such as about 0.02 wt. %.

As explained above, both a surfactant and/or a thickener may be used to increase the dispersion stability of the $MnO_2$. Formation of a stable dispersion is important because it helps to ensure that:

A. the desired amount of $MnO_2$ is incorporated into each glove;

B. the $MnO_2$ is dispersed uniformly within each glove; and

C. the production of the $MnO_2$-containing glove avoids complications arising from sedimentation and caking of the $MnO_2$ dispersion.

All of these points are important to ensure consistency in the permeation resistance performance of the gloves.

In a third embodiment, the invention also provides the use of manganese dioxide in a nitrile glove to increase the chemical permeation barrier performance of the nitrile rubber against hydrogen peroxide.

In a fourth embodiment, the invention also provides a method of increasing the chemical permeation barrier performance of the nitrile rubber of a nitrile glove against hydrogen peroxide, said method comprising a step of incorporating manganese dioxide into the nitrile glove or a precursor to the nitrile glove.

The nitrile glove and manganese dioxide in the second to fourth embodiments of the invention may have any property as described above in relation to the first embodiment of the invention.

The invention is illustrated by the below Examples, which are not to be construed as limitative.

EXAMPLES

Preparative Example 1: Preparation of Manganese Dioxide ($MnO_2$) Micro-Particles Dispersion $MnO_2$ powder (>85% purity) was first premixed with water to prepare a slurry of $MnO_2$. 1.5 wt % of poly-acrylic acid (versus dry weight of $MnO_2$ powder) and 0.02-0.1 wt % of Surfadol TG (versus weight of total solvent) was added into the slurry to improve dispersion and wettability. The slurry was then subjected to wet milling in a mill to achieve the desired particle size. Final total solids content (TSC) of the prepared dispersion was 7-30 wt %, with average particle size ranging from 0.5-10 μm.

The particle size of $MnO_2$ was measured using a Horiba Partica particle size analyser. The measurement was conducted using laser diffraction method with Refractive Index (RI) applied at 2.2. The measurement is reported based on volume-based mean particle size.

Example 1: Preparation of Acrylonitrile Butadiene (NBR) Gloves Impregnated with $MnO_2$ Micro-Particles In preparation for the starting material, the desired concentration of nitrile latex is prepared in a pail. SDBS (Sodium dodecylbenzenesulfote), vulcanizing accelerator and ZnO were mixed together into the latex in accordance to the compositional proportion given for the latex. The compounded latex was stirred accordingly. During the stirring, pH adjustment was performed by addition of purified water and aqueous potassium hydroxide solution. The $MnO_2$ particle dispersion was slowly added drop-wise to the NBR latex up to the desired concentration.

The NBR gloves were produced by using the as-prepared $MnO_2$ containing NBR latex.

Former Cleaning

First, the glove former was washed in turn with nitric acid, aqueous sodium hydroxide solution and hot water in order to remove any impurities on the surface. The former was then dried. The glove former was then immersed into aqueous solution of coagulant agent containing 10-20 wt % of calcium nitrate at 55-65° C. The glove former with a thin layer of coagulant was then dried at temperature of 55-65° C.

Dipping of $MnO_2$ Impregnated NBR Gloves

The dried former was then dipped into the prepared $MnO_2$ containing latex which had been thoroughly stirred and mixed. After dipping the former into the $MnO_2$ containing latex for 20 seconds at temperature of 40-60° C., a latex layer containing $MnO_2$ particles will adhere and form. Next, the former with $MnO_2$ containing latex layer adhered was dried in an oven at temperature ranging from 80-150° C. After that, the residue/excess chemicals were removed by hot water (40-60° C.) in a leaching tank. The $MnO_2$ containing latex film on the former surface was vulcanized by heating at a temperature of 80-150° C.

Chlorination Process

Soon after vulcanization, the glove former surface (the donning side when the glove is in use) was chlorinated using a hypochlorite-hydrochloric acid mixture at a concentration of 800-2000 ppm. Then, it was follow by a neutralization process with alkali, washed with water and finally dried.

Example 2: Determination of $H_2O_2$ Chemical Permeation Level

Detection of $H_2O_2$ was conducted using Ion Chromatography—Electrochemical Detector (Metrohm Malaysia), following the standard method as per described in EN16523-1: 2016-2018. The challenge chemical used was Hydrogen Peroxide solution, 30% concentration (CAS No.: 7722-84-1).

Standard calculation formula as below:

Permeation rate, $$P_i = \frac{(C_i - C_{i-1})(V_t - [i-1]V_s)}{(t_i - t_{i-1})A}$$

$P_i$=permeation rate, in μg/cm/min

A=area of material specimen in contact, in $cm^2$ i=indexing number assigned to each discrete sample, starting with i=1 for 1st sample.

$T_i$=time at which discrete sample I was removed, in minutes $C_i$=concentration of chemical in collecting medium at time $T_i$ in micrograms per litre $V_t$=Total volume of collecting medium, in litres $V_s$=Volume of discrete samples removed from collecting medium, in litres Results and Discussion:

The prepared gloves were assigned names as set out below.

| Sample | Nomenclature |
| --- | --- |
| Control | Control |
| NBR30 + 0.1 phr MnO$_2$ | NBR30_MnO2-0.1 phr |

FIG. 1 shows the appearance of NBR for each MnO$_2$ content level. The color of the gloves was tuned from bright blue to dark blue and with a matte-shiny finish. This evidences that MnO$_2$ micro-particles were successfully incorporated within the NBR film, resulting in a color darkening effect. The incorporation of 0.1 phr MNO$_2$ had minimal effect on the glove's color (compared to the control gloves).

Figure 2:
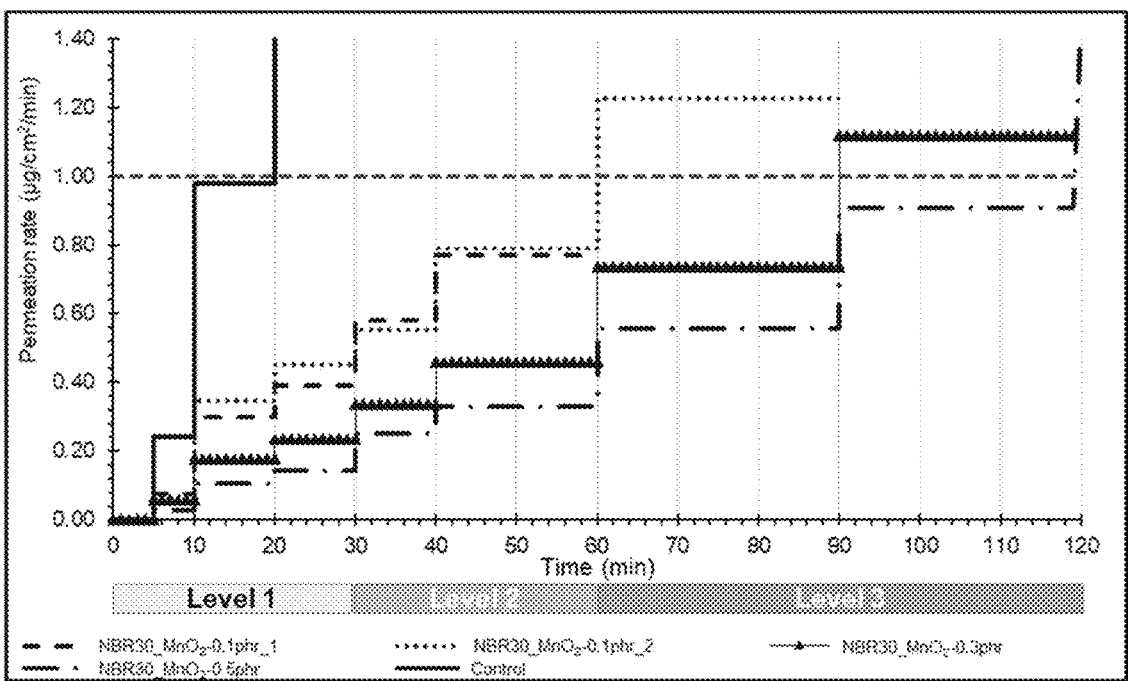
FIG. 2 shows the breakthrough time for hydrogen peroxide for nitrile gloves having varying amounts of manganese dioxide dispersed within the rubber. The breakthrough time was assessed according to EN ISO 374-1.

FIG. 2 illustrates the chemical permeation barrier performance of tested gloves towards H$_2$O$_2$. The solid black line represented the control production gloves, on which the breakthrough time (BTT, denoted by the horizontal dotted line) at the borderline of level 1 to 2 performance level (>30 minutes required). With the incorporation of 0.1 phr MnO$_2$ in the NBR gloves, the performance level is enhanced significantly, and the BTT is over 40 minutes as shown by the fact that the permeation rate does not reach the breakthrough time threshold until after data recording was stopped at 40 minutes. The BTT is further improved by addition of higher amounts of MnO$_2$, as shown by the BTT of >60 minutes for 0.3 phr and 0.5 phr MnO$_2$ (labelled as NBR30_MnO$_2$-0.3 phr & 0.5 phr). These results show that gloves according to the invention are able to achieve performance range of Level 3 (based on EN16523-1).

Figure 3:
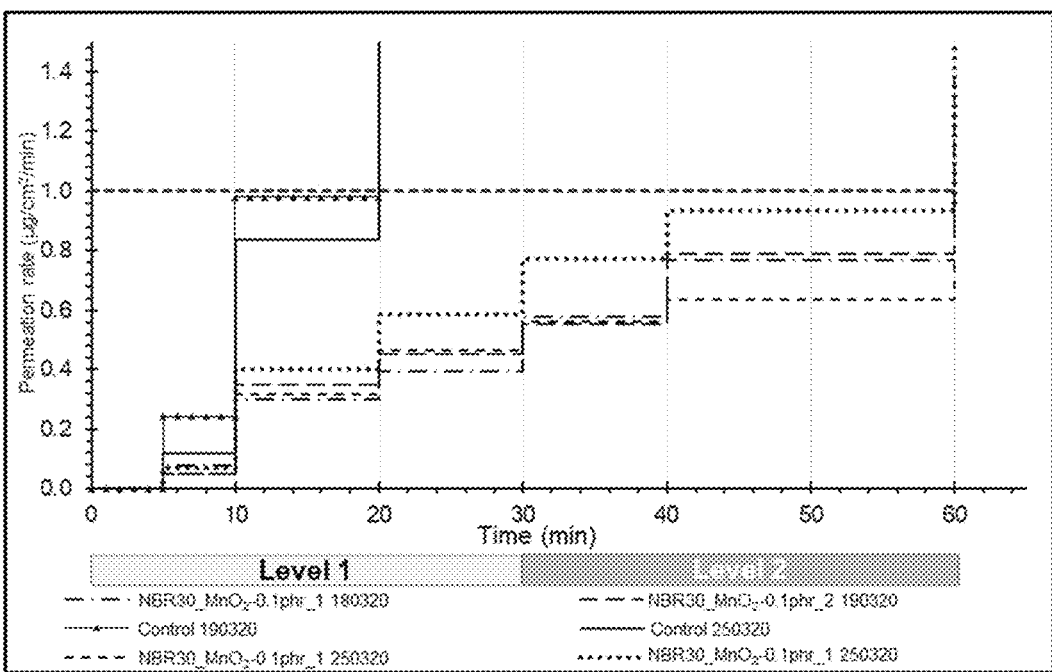
FIG. 3 shows further results for the breakthrough time as assessed according to EN ISO 374-1, demonstrating the reproducibility of the results in FIG. 2.

The H$_2$O$_2$ permeation tests for NBR30_MnO$_2$-0.1 phr were repeated in order to validate these results (FIG. 3). The repeated tests showed that the BTT is consistently >40 minutes.

Figure 4:
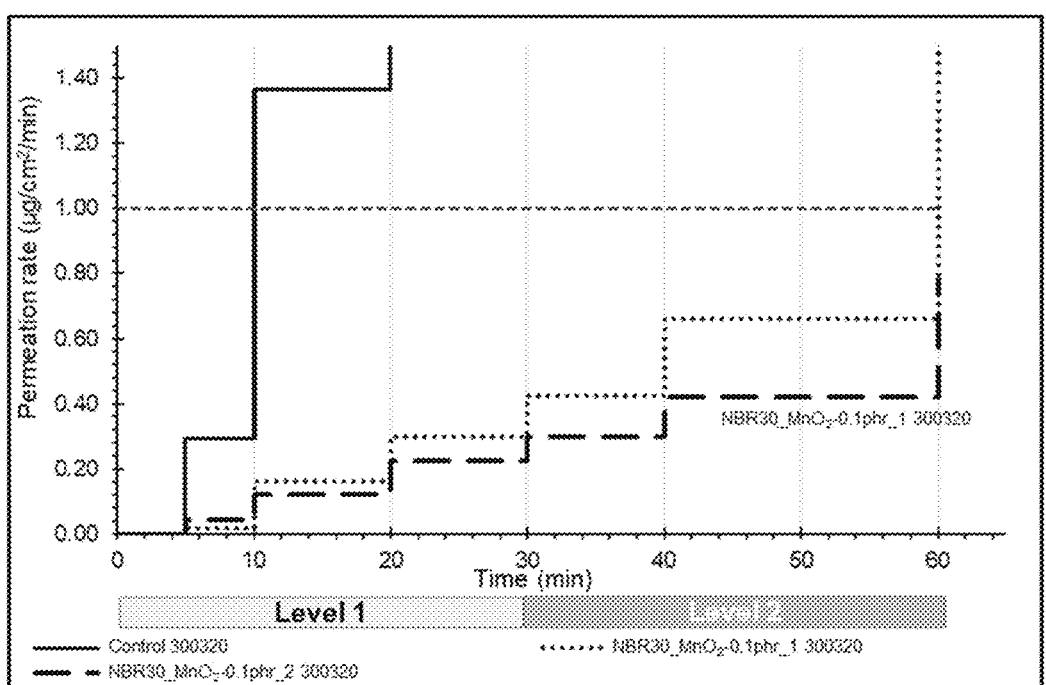
FIG. 4 shows breakthrough time results for a different batch of rubber as compared to the results in FIG. 2. The breakthrough time was assessed according to EN ISO 374-1.

Lastly, in order to evaluate the robustness of MnO$_2$ micro-particles addition into the nitrile gloves, a subsequent batch of NBR/0.1 MnO$_2$ gloves was prepared and subjected to chemical permeation test. Again both the gloves dipped at different compounding days consistently showed BTT of >40 minutes (labelled as NBR30_MnO2-0.1 phr_Day 2 & Day 4), as shown in FIG. 4. These results indicate that the -continued

| Sample | Nomenclature |
| --- | --- |
| NBR30 + 0.3 phr MnO$_2$ | NBR30_MnO2-0.3 phr |
| NBR30 + 0.5 phr MnO$_2$ | NBR30_MnO2-0.5 phr | procedures described above resulted in successful incorporation of MnO$_2$ micro-particles within the nitrile glove film, which acted as a heterogeneous catalyst that effectively broke down H$_2$O$_2$ upon contact, forming water and oxygen as breakdown products. As a result of the catalytic breakdown of H$_2$O$_2$, the only products to fully permeate the glove are water and oxygen, which are harmless.

Mechanical properties of the rubber gloves were assessed in accordance with ASTM protocols, and the results are provided in Table 2 below.

TABLE 2

| | Mechanical properties (ASTM) of nitrile gloves with various levels of MnO$_2$ content | | | | |
| --- | --- | --- | --- | --- | --- |
| Glove | Tensile Strength (MPa) | Elongation at Break (%) | Force at Break (Newton) | M300 (MPa) | M500 (MPa) |
| Control | 41.55 ± 1.5 | 590.1 ± 6.1 | 7.43 ± 0.4 | 7.5 ± 0.31 | 14.6 ± 3.59 |
| NBR30_MnO2-0.1 phr | 42.42 ± 3.4 | 603.2 ± 7.5 | 6.12 ± 0.8 | 7.4 ± 0.11 | 18.4 ± 2.75 |
| NBR30_MnO2-0.3 phr | 31.46 ± 2.0 | 577.6 ± 9.1 | 6.20 ± 0.4 | 6.9 ± 0.05 | 15.8 ± 2.74 |
| NBR30_MnO2-0.5 phr | 35.53 ± 2.3 | 615.2 ± 12.7 | 6.19 ± 0.4 | 6.1 ± 0.26 | 11.9 ± 1.89 |

Conclusion

Nitrile examination gloves incorporated with MnO$_2$ micro-particles can be successfully produced by the methods outlined above. Addition of 0.1 phr of MnO$_2$ significantly improved the chemical BTT for hydrogen peroxide to more than 40 minutes, as compared to the control gloves (20 minutes). Further increase in content of MnO$_2$ up to 0.5 phr resulted much longer BTT (more than 90 minutes). This proves that the impregnation of MnO$_2$ micro-particles within the gloves membrane protects against the permeation of hydrogen peroxide. It is believed that MnO$_2$ acts as a heterogeneous catalyst that breaks down H$_2$O$_2$ upon contact. This catalytic reaction significantly improved the chemical resistance performance without compromising the mechanical properties of said gloves (see FIGS. 5a-5e). The properties obtained by the manganese dioxide-containing nitrile gloves are reproducible, as shown by FIGS. 6a and 6b.

Example 3: Investigation of MnO$_2$ Milling (Dispersion)

The effect of the surfactant used during preparation of the MnO$_2$ dispersion was investigated on a large scale. Two surfactants were used: poly acrylic acid, sodium salt (PAA) and naphthalenesulfonic acid, sodium salt (napthalenesulfonic acid).

Effect of Surfactant: Poly(Acrylic Acid), Sodium Salt (PAA)

PAA was used as the starting dispersing agent. However, use of PAA can result in issues such as instability of the MnO$_2$ dispersion, which directly and indirectly impacts the effective dosage of MnO$_2$ into gloves, and subsequently affects the permeation resistance performance consistency. Therefore, trials were conducted by preparing MnO$_2$ dispersions at a fixed solid content of 30%. Various amount of PAA ranging from 0.2 to 2 wt % were added into the dispersion. As recorded in Table 3 below, a hard sludge of MnO$_2$ sediments was formed when the prepared dispersions were left untouched for approximately 10 minutes (this phenomenon is referred to as "caking"). Surprisingly, the caking phenomenon observed is in alignment with the PAA dosage.

It was therefore surprisingly concluded that PAA is not a suitable candidate as dispersant for $MnO_2$.

TABLE 3

Formulation of $MnO_2$ dispersion with addition of PAA as dispersant.

| No. | TSC % | wetting agent (Surfadol TG) % | Dispersing agent (PAA) % | Observation (in 10 minutes) |
|---|---|---|---|---|
| 1 | 30 | 0.02 | 0.2 | Caking observed |
| 2 | 30 | 0.02 | 0.5 | Caking observed |
| 3 | 30 | 0.02 | 1 | Caking observed |
| 4 | 30 | 0.02 | 2 | Caking observed |

Effect of Surfactant: Naphthalenesulfonic Acid, Sodium Salt (Napthalenesulfonic Acid)

Similarly, for (Napthalenesulfonic acid) study, a $MnO_2$ dispersion was prepared at a fixed solid content of 30%. Various sets of dispersion were prepared by varying the loading content of (napthalenesulfonic acid) from 0.5 to 2 wt. %. Generally, the rate of sedimentation reduced with increased napthalenesulfonic acid content. Furthermore, the inventors observed that none of the prepared dispersions suffered from caking. Therefore, it was concluded that napthalenesulfonic acid is a suitable surfactant for dispersion of $MnO_2$ in water. Results are shown in Table 4 below.

TABLE 4

Formulation of $MnO_2$ dispersion with addition of (Napthalenesulfonic acid) as dispersant.

| No. | TSC % | wetting agent (Surfadol TG) % | Dispersing agent (Napthalenesulfonic acid) % | Observation (in 10 minutes) |
|---|---|---|---|---|
| 1 | 30 | 0.02 | 0.5 | Fast sedimentation, no caking |
| 2 | 30 | 0.02 | 1.0 | Gradual sedimentation, no caking |

TABLE 4-continued

Formulation of $MnO_2$ dispersion with addition of (Napthalenesulfonic acid) as dispersant.

| No. | TSC % | wetting agent (Surfadol TG) % | Dispersing agent (Napthalenesulfonic acid) % | Observation (in 10 minutes) |
|---|---|---|---|---|
| 3 | 30 | 0.02 | 1.5 | No sedimentation, no caking |
| 4 | 30 | 0.02 | 2.0 | No sedimentation, no caking |

Effect of Surfactant: Napthalenesulfonic Acid+Thickener

Following the identification of napthalenesulfonic acid as a suitable dispersant for $MnO_2$, the inventors encountered a further problem—the successful dispersion of $MnO_2$ in water over time. This issue has affects the milling efficiency, where a significant loss in solid content recovery over time was observed (due to rapid sedimentation of $MnO_2$ during the lengthy milling process). Therefore, the inventors introduced bentonite as thickener (5 wt. % compared to the weight of active powder) to increase the tendency of $MnO_2$ suspend within the medium. In an effort of increase the suspension ability of the dispersion, an initial trial was performed including increase of initial total solids content (TSC) ranging from 35 to 45%. However, both trials failed since the viscosity of dispersion increased significantly to the extent where the dispersions were no longer flow-able. On the other hand, with addition of thickener, TSC recovery was successfully improved up to 8%, with a stable dispersion observed. Results are provided in Table 5 below.

TABLE 5

Summary of Dispersion Preparation Trials

| No. | Media Water (g) | $MnO_2$ Powder (g) | Total Volume Total (g) | TSC % | wetting agent (Surfadol TG) % | Dispersing agent (Napthalenesulfonic acid) % | Observation | Thickener % | TSC Recovery (%) |
|---|---|---|---|---|---|---|---|---|---|
| 1 | 550 | 450 | 1000 | 45 | 0.02 | 2 | Not able to mill (too thick) | 5 | Failed |
| 2 | 650 | 350 | 1000 | 35 | 0.02 | 1.5 | Not able to mill (too thick) | 5 | Failed |
| 3 | 700 | 300 | 1000 | 30 | 0.02 | 1.5 | Stable dispersion Lower TSC | 0 | 73.46 |
| 4 | 700 | 300 | 1000 | 30 | 0.02 | 1.5 | Stable dispersion | 5 | 81.81 |

Optimisation of Milling Process

Generally, the preparation of a $MnO_2$ dispersion involves two stages.

A. Pre-mixing the raw material.

B. Wet-milling process.

Both stages are critical in order to achieve the target dispersion with the required particle sizes within the defined period. The inventors evaluated the pre-mixing stages with two different types of mixer: a saw-tooth blade dissolver and a high shear rotor-stator mixer. The findings are summarised in Table 6 below. The combination of a high shear rotor stator mixer and wet milling (Option 2) provides a clear advantage of achieving the target size with a significantly shorter duration.

TABLE 6

| | | Milling process combination and efficiency | | | | | | | |
|---|---|---|---|---|---|---|---|---|---|
| | | Particle size mill (µm) | | | Pre-mixing duration | Particle size after mill (µm) | | | Milling duration |
| Option | Pre-mixer type | D50 | D90 | Mean before | (hour) | D50 | D90 | Mean | (hour) |
| 1 | Saw-tooth blade dissolver | 6.69 | 23.74 | 9.92 | 1 | 1.83 | 4.35 | 2.28 | 3 hour |
| 2 | High shear rotor stator mixer | 4.89 | 10.55 | 6.16 | 1 | 2.23 | 5.66 | 2.84 | 1 hour |

Example 4: Industrial Grade Materials

The preliminary testing discussed above involved mainly analytical grade raw materials, which are not feasible for large-scale production. The inventors sourced materials from two industrial grade suppliers, namely Industrial-1 and Industrial-2 (Industrial-2 was more cost effective). Interestingly, at an equivalent dosage of 0.1 phr, both industrial grade products were less effective in $H_2O_2$ quenching ability as compared to the products produced from analytical grade materials. This might be due to the purity of the materials (e.g. analytical grade purity is up to 95%, whereas industrial grade falls at a level of approximately 85%). The inventors conducted a series of optimization of dosage loading towards the loading based on industrial grade.

Optimization of Effective Dosage Based on Industrial Grade $MnO_2$

Figure 5:
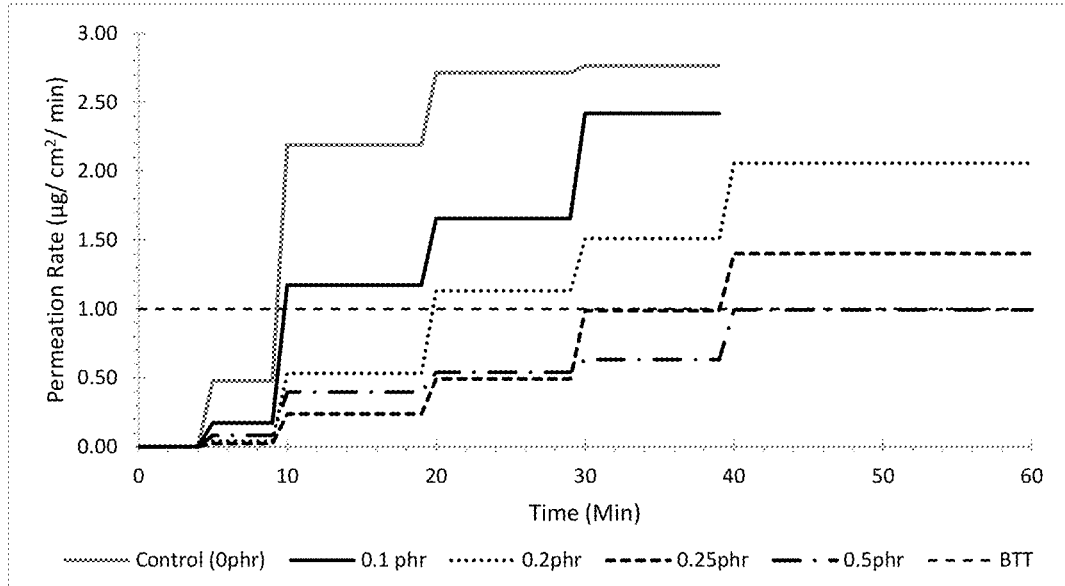
FIG. 5 shows breakthrough time results for gloves prepared from industrial grade $MnO_2$, as discussed in Example 4.

Since the quenching effect of industrial grade $MnO_2$ is lower than analytical grade $MnO_2$, the inventors conducted a screening to identify the effective dosage of industrial $MnO_2$ into the gloves over the range from 0.1 phr to 0.5 phr (with gloves weight fixed at 3 g). Here we utilize Industrial-2 as the $MnO_2$ source. As shown in FIG. 5, Control gloves (0 phr $MnO_2$) consistently show a low permeation resistance level at 10 minutes. With addition of $MnO_2$, the permeation rate gradually reduced as a function of $MnO_2$ dosage. 0.2 phr of $MnO_2$ improved the permeation resistance up to 20-30 minutes, whereas excess dosage of 0.5 phr $MnO_2$ resulted up to 60 minutes of resistance. An intermediate dosage of 0.25 phr $MnO_2$ provided intermediate protection, falling at the level in between 30-40 minutes interval.

Comparison of Industrial Grades as the Function of Permeation Resistance Performance Two industrial grade sources were evaluated in order to verify the suitability in terms of cost versus effectiveness, as shown in Table 7 below. Overall, both sources showed comparable results in terms of chemical resistance performance, at the same effective dosage of 0.25 phr, except for a minor inconsistency observed for Industrial-1 grade. Therefore, it is clear that Industrial-2 grade is the best option to go for in terms of effectiveness in terms of performance and cost.

TABLE 7

| | Chemical Permeation resistance vs $MnO_2$ grades | | | |
|---|---|---|---|---|
| | $MnO_2$ Source | | | |
| | Industrial-1 | | Industrial-2 | |
| | Dosage | | | |
| | 0.25 phr | | 0.25 phr | |
| | Set | | | |
| | A | B | A | B |
| Permeation Time | Permeation rate (Permeation Rate (µg/cm²/min) | | | |
| 0 | 0.000 | 0.000 | 0.000 | 0.000 |
| 5 | 0.030 | 0.052 | 0.007 | 0.024 |
| 10 | 0.341 | 0.252 | 0.205 | 0.239 |
| 20 | 0.710 | 0.609 | 0.537 | 0.493 |
| 30 | 1.142 | 0.424 | 0.886 | 0.988 |
| 40 | 1.246 | 1.250 | 1.349 | 1.403 |
| 60 | 1.835 | 1.223 | 1.534 | 0.498 |

**Breakthrough time = 1 µg/cm²/min

Permeation Resistance Consistency of Optimized Industrial-2 $MnO_2$ Dispersion

To evaluate the consistency and reproducibility of the said optimized dispersion, the inventors conducted an automated robotic gloves dipping process for 3 g gloves, with effective dosage of 0.25 phr Industrial-2 $MnO_2$ dispersion loaded. Two different batches were prepared and 3 units of produced gloves were selected at random and subjected to the chemical resistance test, with results shown in Table 8. In summary, all gloves tested were able to achieve up to 40 minutes of chemical resistance performance at the same dosage level, regardless of the production batches.

TABLE 8

| | Performance consistency of optimized $MnO_2$ dispersion | | | | | |
|---|---|---|---|---|---|---|
| | $MnO_2$ batches | | | | | |
| | 1 8 Mar. 2021 | | | 2 17 May 2021 | | |
| | Sample | | | | | |
| Time (min) | A | B | C | D | E | F |
| | Permeation rate (Permeation Rate (µg/cm²/min) | | | | | |
| 0 | 0 | 0 | 0 | 0 | 0 | 0 |
| 5 | 0.24 | 0.11 | 0.19 | 0.13 | 0.13 | 0.12 |
| 10 | 0.64 | 0.51 | 0.51 | 0.55 | 0.59 | 0.50 |
| 20 | 0.77 | 0.67 | 0.85 | 0.73 | 0.76 | 0.98 |
| 30 | 0.80 | 0.92 | 0.93 | 1.06 | 0.39 | 0.72 |

13

TABLE 8-continued

| | | | | | | |
|---|---|---|---|---|---|---|
| Performance consistency of optimized MnO$_2$ dispersion | | | | | | |
| | MnO$_2$ batches | | | | | |
| | 1<br>8 Mar. 2021 | | | 2<br>17 May 2021 | | |
| | Sample | | | | | |
| Time<br>(min) | A | B | C | D | E | F |
| | Permeation rate (Permeation Rate (µg/cm$^2$/min) | | | | | |
| 40 | 1.40 | 1.59 | 1.57 | 0.41 | 1.32 | 1.65 |
| 60 | 2.00 | 1.13 | 1.48 | 1.88 | 1.66 | 2.19 |

**Breakthrough time = 1 µg/cm$^2$/min

The invention claimed is:

1. A nitrile glove comprising manganese dioxide, wherein the manganese dioxide is impregnated within the nitrile rubber of the nitrile glove and the manganese dioxide is present in an amount of from about 0.05 parts per hundred rubber (phr) to about 0.9 parts per hundred rubber.

2. The nitrile glove according to claim 1, wherein the manganese dioxide is present in the form of micro-particles.

3. The nitrile glove according to claim 2, wherein the micro-particles of manganese dioxide have a mean particle size of from about 0.1 µm to about 20 µm.

4. The nitrile glove according to claim 1, where the manganese dioxide is present in an amount of about 0.1 phr to about 0.85 phr.

5. The nitrile glove according to claim 4, where the manganese dioxide is present in an amount of about 0.3 phr to about 0.7 phr.

6. The nitrile glove according to claim 1, wherein the manganese dioxide is provided in a form that is able to catalyse the reduction of hydrogen peroxide to water and oxygen.

7. The nitrile glove according to claim 1, wherein the manganese dioxide does not form part of a crosslink in the glove.

8. A method of preparing a nitrile glove according to claim 1, the method comprising the following steps:
   (i) providing a dispersion of manganese dioxide;
   (ii) adding the manganese dioxide dispersion to compounded nitrile latex; and
   (iii) forming a glove from the compounded nitrile latex.

9. The method according to claim 8, further comprising adding a surfactant to the dispersion of manganese dioxide in step (i).

10. The method according to claim 9, wherein the surfactant is present in the dispersion in an amount of from 0.1 to 3 wt. %.

11. The method according to claim 9, further comprising adding a thickener to the dispersion of manganese dioxide in step (i).

12. The method according to claim 9, further comprising adding a wetting agent to the dispersion of manganese dioxide in step (i).

13. A method of increasing the chemical permeation barrier performance of the nitrile rubber of a nitrile glove against hydrogen peroxide, said method comprising a step of incorporating manganese dioxide into the nitrile glove or a precursor to the nitrile glove, wherein the manganese dioxide is impregnated within the nitrile rubber of the nitrile glove and the manganese dioxide is present in an amount of from about 0.05 parts per hundred rubber (phr) to about 0.9 parts per hundred rubber.

14. The method according to claim 8, wherein the manganese dioxide is micro-particles of manganese dioxide.

15. The method according to claim 14, wherein the micro-particles of manganese dioxide have a mean particle size of from about 0.1 µm to about 20 µm.

16. The method according to claim 14, wherein the micro-particles of manganese dioxide are present in the nitrile glove in an amount of from 0.05 parts per hundred rubber (phr) to 0.9 parts per hundred rubber.

17. The method according to claim 8, wherein the manganese dioxide is micro-particles of manganese dioxide.

* * * * *